(12) United States Patent
Hu et al.

(10) Patent No.: US 10,677,503 B2
(45) Date of Patent: Jun. 9, 2020

(54) HEAT EXCHANGER

(71) Applicants: Johnson Controls Technology Company, Milwaukee, WI (US); Johnson Controls Building Efficiency Technology (Wuxi) Company, Ltd., Jiangsu (CN)

(72) Inventors: Hongming Hu, Jiangsu (CN); Xiuping Su, Jiangsu (CN); Shenglong Wang, Jiangsu (CN); Mark R. Bodell, II, York, PA (US); Andrew M. Welch, Mount Wolf, PA (US)

(73) Assignees: Johnson Controls Technology Company, Auburn Hills, MI (US); Johnson Controls Builsing Efficiency Technology (Wuxi) Company, Ltd., Jiangsu (CN)

(*) Notice: Subject to any disclaimer, the term of this patent is extended or adjusted under 35 U.S.C. 154(b) by 346 days.

(21) Appl. No.: 15/852,789

(22) Filed: Dec. 22, 2017

(65) Prior Publication Data
US 2018/0120002 A1 May 3, 2018

Related U.S. Application Data

(60) Division of application No. 14/494,967, filed on Sep. 24, 2014, now Pat. No. 9,857,109, which is a
(Continued)

(30) Foreign Application Priority Data
Sep. 9, 2014 (CN) .......................... 2014 1 0455576

(51) Int. Cl.
*F25B 39/04* (2006.01)
*F25B 49/02* (2006.01)
(Continued)

(52) U.S. Cl.
CPC .............. *F25B 39/04* (2013.01); *F25B 40/02* (2013.01); *F25B 49/025* (2013.01); *F28B 1/02* (2013.01);
(Continued)

(58) Field of Classification Search
CPC .... F28F 9/026; F28F 9/028; F28F 9/22; F28F 13/003; F28F 13/06; F25B 39/04; F25B 40/02; F28D 7/1607
See application file for complete search history.

(56) References Cited

U.S. PATENT DOCUMENTS 1,233,138 A 7/1917 Snow
1,578,032 A 3/1926 Hodgkinson
(Continued)

FOREIGN PATENT DOCUMENTS

AT 507552 A4 * 6/2010 ............ F28F 9/0268
EP 660063 A2 * 12/1994 ................ F28F 9/02
(Continued)

OTHER PUBLICATIONS

Chinese Office Action for CN Application No. 201410455576.7 dated Apr. 10, 2018, 7 pgs.

*Primary Examiner* — Christopher R Zerphey
(74) *Attorney, Agent, or Firm* — Fletcher Yoder P.C.

(57) ABSTRACT

A condenser includes a shell having a vapor refrigerant inlet, a first tube bundle and a liquid refrigerant outlet. A second tube bundle is positioned in a subcooler component. The subcooler component has a center channel and at least two outer channels and conforms to the shell.

8 Claims, 12 Drawing Sheets

Related U.S. Application Data continuation-in-part of application No. 12/809,839, filed as application No. PCT/US2009/030027 on Jan. 2, 2009, now Pat. No. 9,212,836.

(60) Provisional application No. 61/018,539, filed on Jan. 2, 2008.

(51) Int. Cl.

| | | |
|---|---|---|
| *F28B 1/02* | (2006.01) | |
| *F28D 7/16* | (2006.01) | |
| *F28F 9/02* | (2006.01) | |
| *F28F 13/06* | (2006.01) | |
| *F25B 40/02* | (2006.01) | |
| *F28F 9/22* | (2006.01) | |
| *F25B 1/10* | (2006.01) | |
| *F25B 9/00* | (2006.01) | |

(52) U.S. Cl.
CPC ............ *F28D 7/1607* (2013.01); *F28F 9/028* (2013.01); *F28F 13/06* (2013.01); *F25B 1/10* (2013.01); *F25B 9/008* (2013.01); *F25B 2339/046* (2013.01); *F25B 2339/047* (2013.01); *F25B 2600/024* (2013.01); *F25B 2600/0253* (2013.01); *F25B 2600/0261* (2013.01); *F28F 2009/226* (2013.01); *Y02B 30/741* (2013.01)

(56) References Cited

U.S. PATENT DOCUMENTS

| | | | |
|---|---|---|---|
| 1,578,057 A | | 3/1926 | Morgan |
| 1,578,058 A | | 3/1926 | Morgan |
| 1,591,825 A | | 7/1926 | Hodgkinson |
| 1,672,650 A | | 6/1928 | Lonsdale |
| RE17,480 E | * | 11/1929 | Rathbun ............... F28B 1/00 165/114 |
| 1,764,801 A | | 6/1930 | MacNeill |
| 1,922,843 A | | 8/1933 | Ehrhart |
| 2,049,748 A | | 8/1936 | Rathbun |
| 2,263,397 A | * | 11/1941 | Rathbun ............... F28F 9/22 165/161 |
| 2,392,638 A | | 1/1946 | Bowman et al. |
| 2,830,797 A | | 4/1958 | Garland |
| 3,353,564 A | * | 11/1967 | Bergeijk et al. ..... B01J 19/2415 138/41 |
| 4,007,908 A | * | 2/1977 | Smagghe ............... F16K 47/08 251/127 |
| 4,249,596 A | * | 2/1981 | Tutak ................... B01D 5/0036 165/113 |
| 4,726,418 A | | 2/1988 | Mihailov |
| 4,736,713 A | * | 4/1988 | Roarty ................. F28F 9/0278 122/235.17 |
| 5,129,449 A | * | 7/1992 | Nguyen ................. F25B 39/04 165/110 |
| 5,509,466 A | | 4/1996 | McQuade et al. |
| 5,590,710 A | * | 1/1997 | Sasaki .................. F28F 9/0207 165/173 |
| 5,836,382 A | | 11/1998 | Dingle et al. |
| 6,138,519 A | * | 10/2000 | Bergervoet ............. G01F 1/12 73/861.79 |
| 6,296,049 B1 | | 10/2001 | Ozeki et al. |
| 6,340,002 B1 | * | 1/2002 | Liebig ................. B01D 53/8631 122/4 D |
| 9,506,483 B2 | * | 11/2016 | Kim ....................... F15D 1/001 |
| 2010/0061710 A1 | * | 3/2010 | McClanahan ............ F28F 9/22 392/471 |
| 2011/0226455 A1 | * | 9/2011 | Al-Anizi ................. F28D 7/16 165/177 |
| 2014/0000841 A1 | * | 1/2014 | Baker .................... F25B 29/00 165/59 |
| 2014/0311721 A1 | * | 10/2014 | Esformes ............. F28F 9/0273 165/159 |
| 2019/0116694 A1 | * | 4/2019 | Lyon .................. H05K 7/20272 |

FOREIGN PATENT DOCUMENTS

| | | | | |
|---|---|---|---|---|
| JP | 06101794 A | * | 4/1994 | ............ F16L 55/04 |
| JP | 08223408 | | 9/1996 | |
| WO | WO-02090860 A1 | * | 11/2002 | ............ F28D 7/16 |
| WO | 2009089100 A1 | | 7/2009 | |

* cited by examiner

HEAT EXCHANGER

CROSS-REFERENCE TO RELATED APPLICATIONS

This application is a divisional application of U.S. application Ser. No. 14/494,967, filed Sep. 24, 2014, entitled "HEAT EXCHANGER," which is a continuation-in-part of U.S. application Ser. No. 12/809,839, having a filing or 371(c) date of Jun. 21, 2010, entitled "HEAT EXCHANGER," which was the National Stage of International Application No. PCT/US2009/030027, filed Jan. 2, 2009, entitled "HEAT EXCHANGER," which claims priority to U.S. Provisional Application No. 61/018,539, filed Jan. 2, 2008, entitled "CONDENSER SUBCOOLER," all of which are hereby incorporated by reference in their entireties for all purposes.

BACKGROUND

The application generally relates to heat exchangers in vapor compression systems. The application relates more specifically to a condenser for a vapor compression system having a subcooler component.

In some condensers, a tube bundle(s) may be positioned in a shell or housing and used to circulate a fluid that can exchange heat with refrigerant vapor entering the shell. The transfer or exchange of heat between the refrigerant vapor and the fluid can cause the refrigerant vapor to condense or change phase to a liquid. Before the refrigerant liquid leaves the condenser, the refrigerant liquid may be further cooled, i.e., subcooled, by a second tube bundle that can be positioned as a subcooler component. The subcooler component can control the flow of the refrigerant liquid over the second tube bundle, which also circulates a fluid, to further exchange or transfer heat with the refrigerant liquid.

In many applications, it is desirable for only liquid refrigerant to enter the subcooler component, as vapor refrigerant entering the subcooler component may decrease the efficiency of the second tube bundle because the rate of convective heat transfer for refrigerant in the vapor phase is much less than for refrigerant in the liquid phase. Further, allowing refrigerant vapor to enter the subcooler component may result in refrigerant vapor leaving the condenser, which can decrease the efficiency of the corresponding vapor compression system because a reduced amount of refrigerant liquid is provided to the remainder of the vapor compression system.

To prevent refrigerant vapor from entering the subcooler component, the subcooler component can be submerged in a reservoir of refrigerant liquid that extends along the length of the condenser shell. The refrigerant liquid reservoir forms a liquid seal that prevents refrigerant vapor from entering the subcooler component. The significant amount of refrigerant liquid required to form the liquid seal can contribute to the cost of the condenser and the system because the refrigerant used for the liquid seal cannot be used towards system capacity.

Therefore, what is needed is a subcooler component that can minimize the amount of liquid refrigerant needed for the liquid seal.

SUMMARY

The present invention is directed to a condenser. The condenser includes a cylindrical shell having an axis, a first tube bundle positioned in the shell and a subcooler positioned in the shell beneath the first tube bundle. The subcooler includes a housing, a second tube bundle enclosed within the housing, at least one inlet and at least one plate grid. The housing has a top surface positioned next to the first tube bundle. The at least one inlet is positioned in the housing to permit liquid refrigerant to enter the housing. The at least one plate grid is positioned above the at least one inlet and connected to the housing and the shell.

The present invention is further directed to a condenser. The condenser includes a cylindrical shell having an axis, a first tube bundle positioned in the shell and a subcooler positioned in the shell beneath the first tube bundle. The subcooler includes a housing. The housing has a top surface positioned next to the first tube bundle. The subcooler also includes a second tube bundle enclosed within the housing, at least one inlet and a cap. The at least one inlet is positioned in the top surface of the housing to permit liquid refrigerant to enter the housing. The cap is positioned on the housing and covers the at least one inlet. The cap and the top surface of the housing define a passageway for liquid refrigerant to flow to the at least one inlet.

The present application relates to a vapor compression system including a compressor, a condenser, an expansion device and an evaporator connected in a closed refrigerant loop. The condenser includes a shell, a first tube bundle, and a second tube bundle. The second tube bundle is positioned in a component configured to reduce the amount of refrigerant liquid in the shell necessary to prevent refrigerant vapor from contacting the second tube bundle.

The present application further relates to a heat exchanger for a condenser including a shell, a first tube bundle, and a second tube bundle. The second tube bundle is positioned in a component configured to prevent refrigerant vapor from contacting the second tube bundle.

The present application also relates to a heat exchanger including a shell, a component, and a tube bundle disposed in the component. The component substantially conforms to the shell and is configured to reduce the amount of refrigerant liquid in the shell necessary to prevent refrigerant vapor from contacting the tube bundle.

In one embodiment, the component includes outer channels and a center channel for directing the flow of refrigerant liquid within the component. The component reduces the refrigerant quantity required in the condenser shell by reconfiguring the tube bundle in the component to better conform to the inside of the condenser shell.

Certain advantages of the embodiments described herein are improved liquid subcooling, a reduction in cost and improved environmental operations through reduced refrigerant charge requirements.

Other features and advantages of the present application will be apparent from the following more detailed description of the embodiment(s), taken in conjunction with the accompanying drawings, which illustrate, by way of example, the principles of the invention.

BRIEF DESCRIPTION OF THE FIGURES

Wherever possible, the same reference numbers will be used throughout the drawings to refer to the same or like parts.

DETAILED DESCRIPTION OF THE EMBODIMENTS

Figure 1:
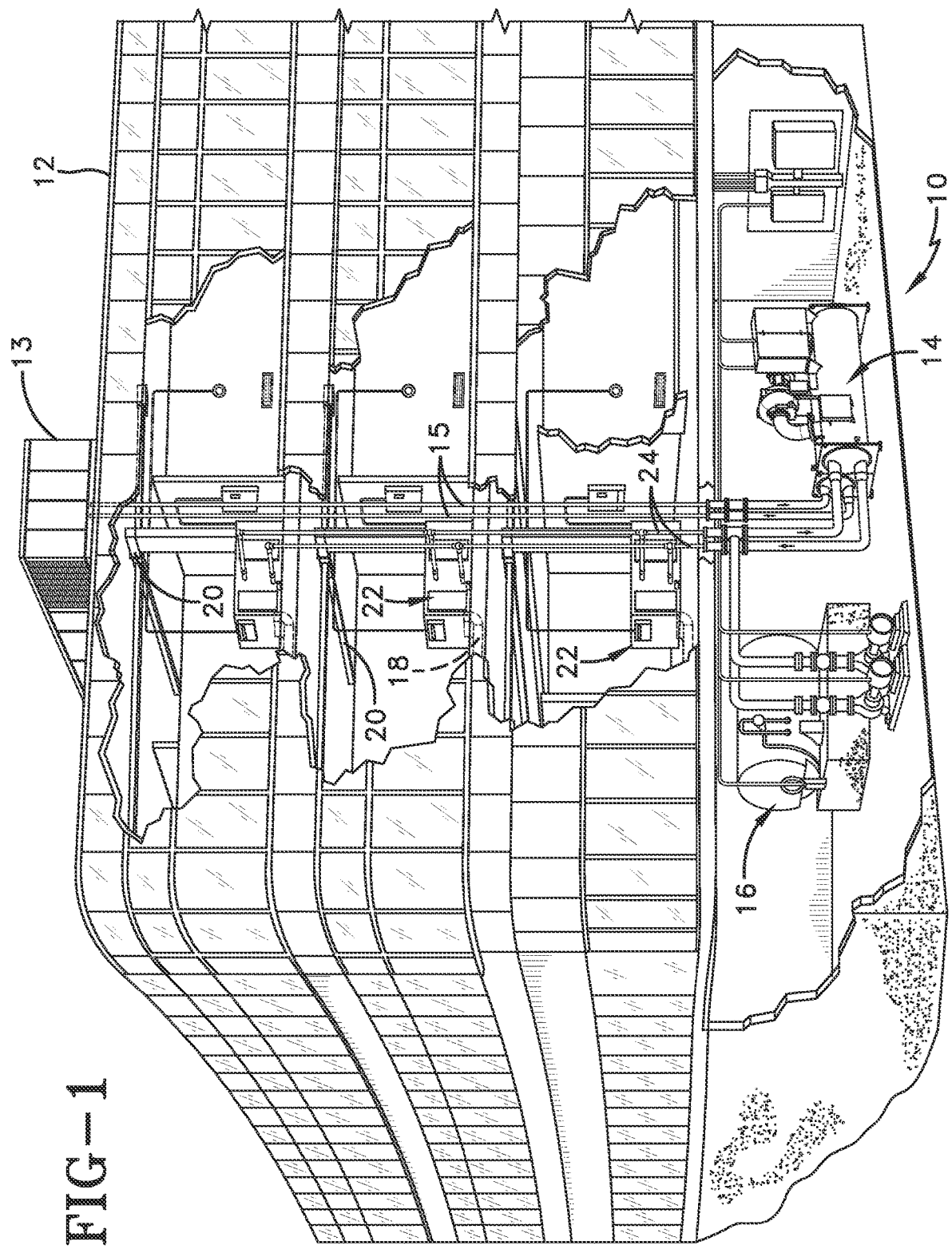
FIG. 1 shows an embodiment of a heating, ventilation and air conditioning system.

FIG. 1 shows an embodiment of a heating, ventilation and air conditioning (HVAC) system 10 in a building 12 in a typical commercial setting. System 10 can include a vapor compression system 14 that can supply a chilled liquid to cool building 12 and a cooling tower 13 that can provide a process fluid to compression system 14 by conduits 15. System 10 can also include a boiler 16 to supply a heated liquid to heat building 12, and an air distribution system that circulates air through building 12. The air distribution system can include an air return duct 18, an air supply duct 20 and an air handler 22. Air handler 22 can include a heat exchanger connected to boiler 16 and vapor compression system 14 by conduits 24. The heat exchanger in air handler 22 may receive heated liquid from boiler 16 and/or chilled liquid from vapor compression system 14, depending on the mode of operation of system 10. In one embodiment, system 10 can include a separate air handler on each floor of building 12, but it will be appreciated that the components may be shared between or among floors.

Figure 2:
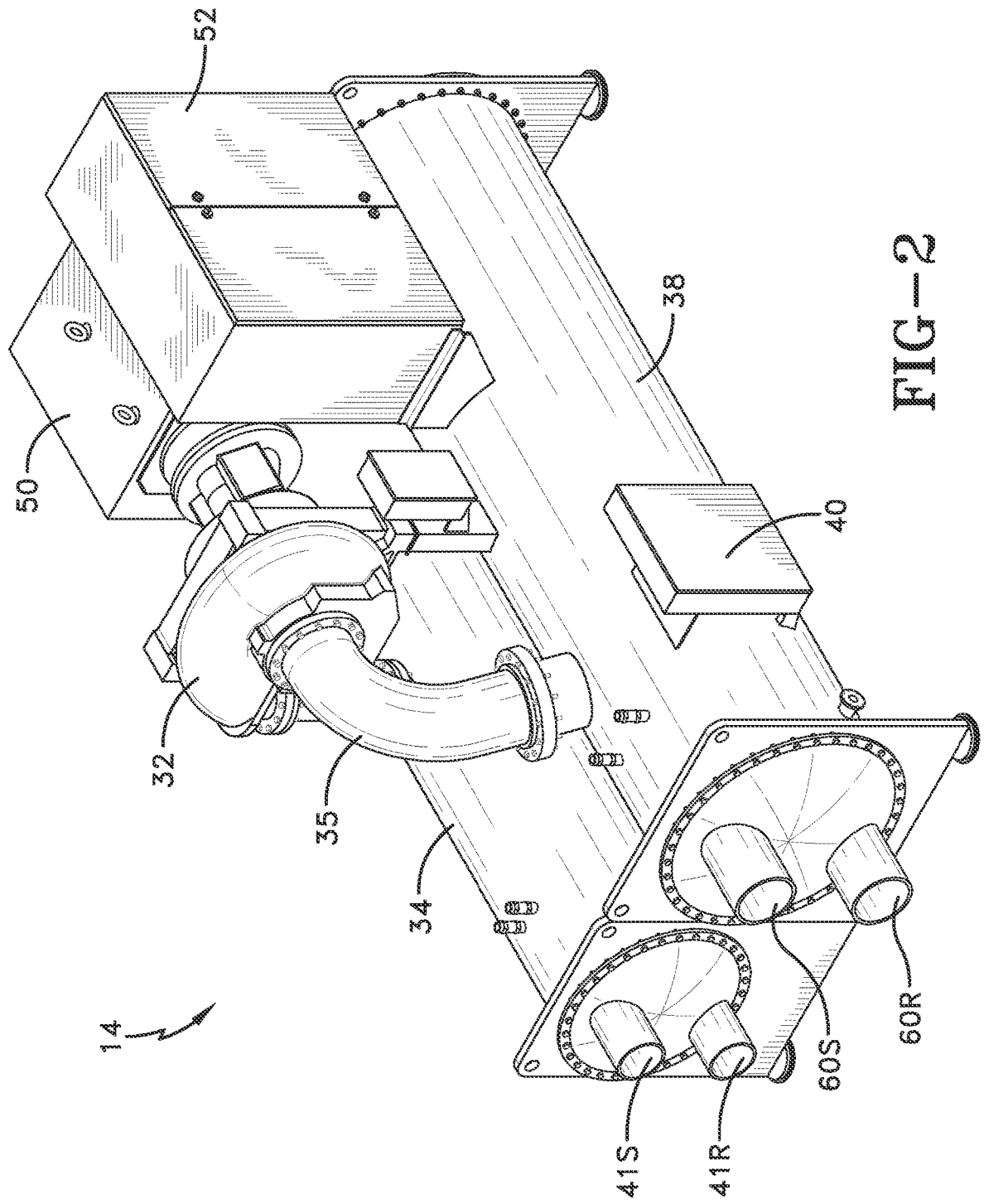
FIG. 2 shows an isometric view of an embodiment of a vapor compression system.
Figure 3:
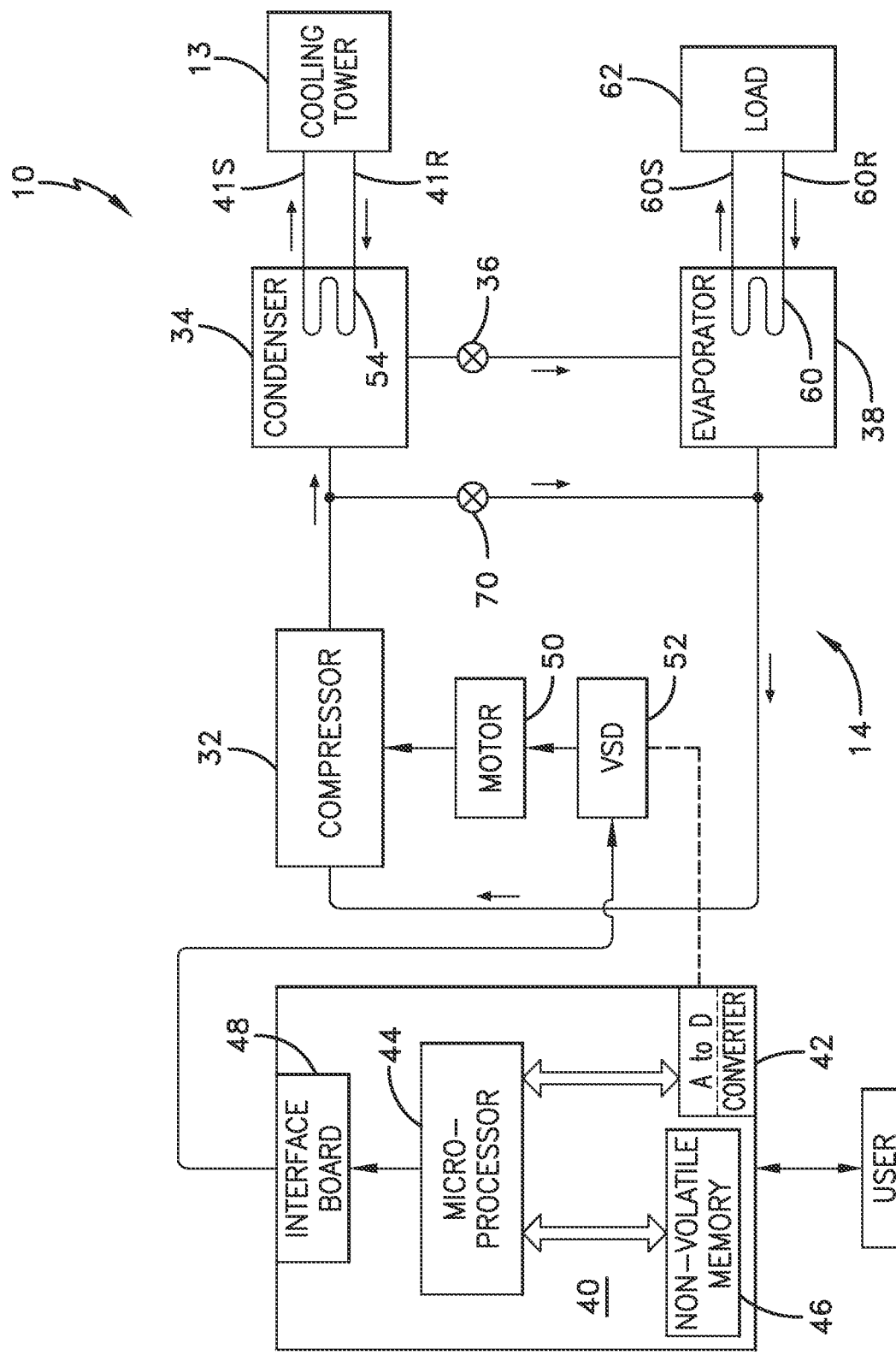
FIG. 3 schematically shows an embodiment of a heating, ventilation and air conditioning system.
Figure 4:
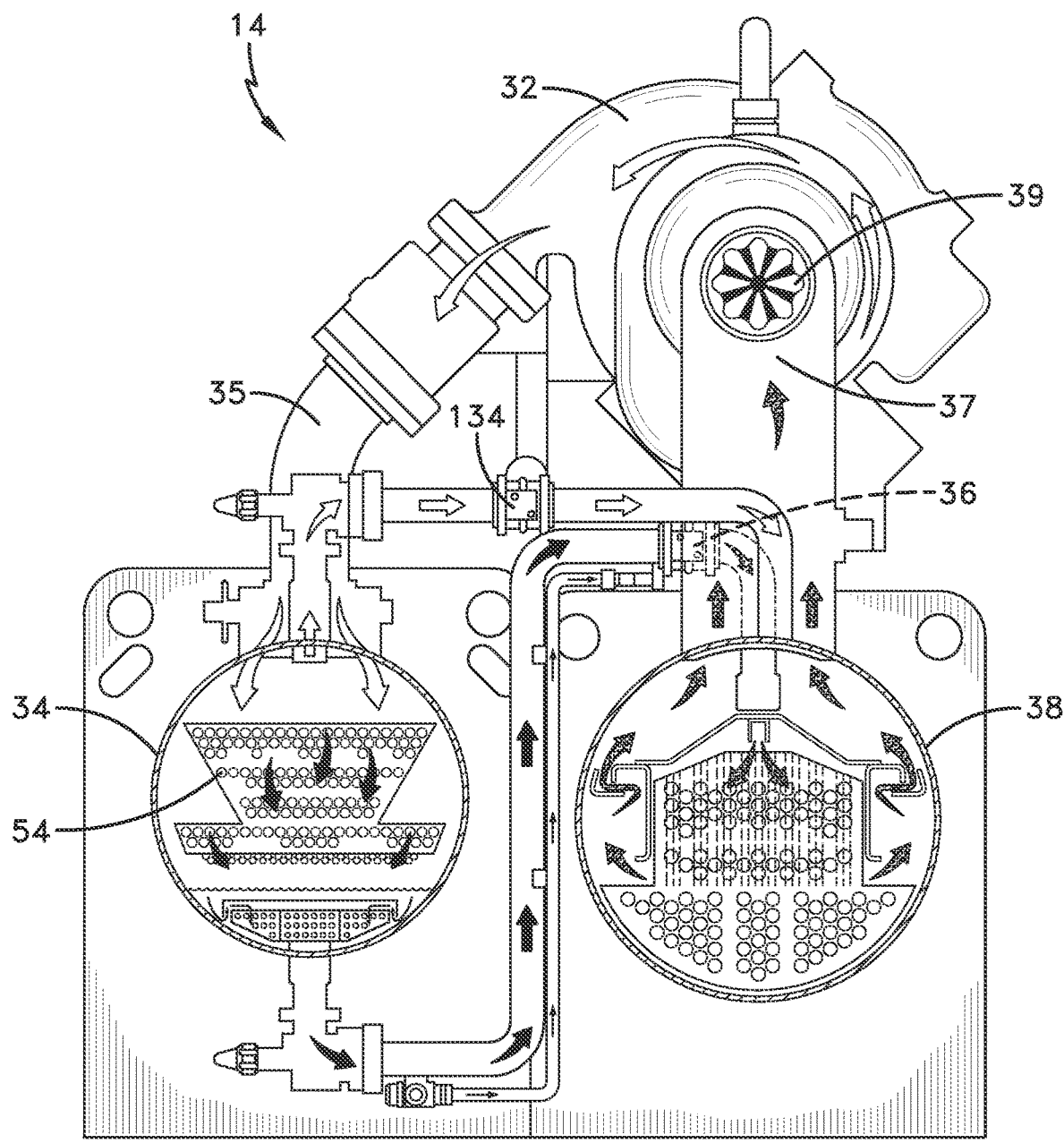
FIG. 4 shows an embodiment of a partial cross sectional view of a vapor compression system.

FIGS. 2-4 show an embodiment of vapor compression system 14 that can be used in HVAC system 10. Vapor compression system 14 can circulate a refrigerant through a circuit starting with compressor 32 and including a condenser 34, expansion valve(s) or device(s) 36, and an evaporator or liquid chiller 38. Vapor compression system 14 can also include a control panel 40 that can include an analog to digital (A/D) converter 42, a microprocessor 44, a non-volatile memory 46, and an interface board 48. Some examples of fluids that may be used as refrigerants in vapor compression system 14 are hydrofluorocarbon (HFC) based refrigerants, for example, R-410A, R-407, R-134a, hydrofluoro olefin (HFO), "natural" refrigerants like ammonia (NH3), R-717, carbon dioxide (CO2), R-744, or hydrocarbon based refrigerants, or any other suitable type of refrigerant.

A motor 50 can be used to drive or operate compressor 32. Motor 50 can be powered by a variable speed drive (VSD) 52 or can be powered directly from an alternating current (AC) or direct current (DC) power source. Motor 50 can be any suitable motor type that can be powered by a VSD or directly from an AC or DC power source, for example, a switched reluctance motor, an induction motor, or an electronically commutated permanent magnet motor. In alternate embodiments, other drive mechanisms such as steam or gas turbines or engines and associated components can be used to drive compressor 32.

VSD 52 receives AC power having a particular fixed line voltage and fixed line frequency from an AC power source and provides AC power to motor 50 at a desired voltage and desired frequency, both of which can be varied to satisfy particular requirements. VSD 52 can provide a variable magnitude output voltage and variable frequency to motor 50 to permit effective operation of motor 50 in response to particular load conditions. Control panel 40 can provide control signals to VSD 52 to operate the VSD 52 and motor 50 at appropriate operational settings for the particular sensor readings received by control panel 40. For example, control panel 40 can provide control signals to VSD 52 to adjust the output voltage and output frequency provided by VSD 52 in response to changing conditions in vapor compression system 14, i.e., control panel 40 can provide instructions to increase or decrease the output voltage and output frequency provided by VSD 52 in response to increasing or decreasing load conditions on compressor 32.

Compressor 32 compresses a refrigerant vapor and delivers the vapor to condenser 34 through a discharge passage 35. In one embodiment, compressor 32 can be a centrifugal compressor having one or more compression stages. However, in other embodiments, compressor 32 can be any suitable compressor type including screw compressor, reciprocating compressor, rotary compressor, swing link compressor, scroll compressor, or turbine compressor. The refrigerant vapor delivered by compressor 32 to condenser 34 transfers heat to a fluid, for example, water or any other suitable liquid. The refrigerant vapor condenses to a refrigerant liquid in condenser 34 as a result of the heat transfer with the fluid. Condenser 34 includes a supply line 41S and a return line 41R for circulating fluid between condenser 34 and cooling tower 13. At cooling tower 13, the fluid from condenser 34 is cooled by exchanging heat with another fluid such as air. The fluid is then returned to condenser 34 through return line 41R, where the fluid is heated by exchanging heat with the refrigerant in the condenser 34. The heated fluid is then removed from the condenser 34 though supply line 41S and provided to the cooling tower 13 to complete the cycle. In the embodiment shown in FIG. 3, condenser 34 is water cooled and includes a tube bundle 54 connected to a cooling tower 13. The tube bundle 54 in condenser 34 can include a plurality of tubes and a plurality of tube bundles.

The liquid refrigerant from condenser 34 flows through expansion device 36 to evaporator 38. A hot gas bypass valve (HGBV) 70 may be connected in a separate line extending from compressor discharge to compressor suction. The liquid refrigerant delivered to evaporator 38 absorbs heat from another fluid, which may or may not be the same type of fluid used for condenser 34, and undergoes a phase change to a refrigerant vapor. In the embodiment shown in FIG. 3, evaporator 38 includes a tube bundle 60 having a supply line 60S and a return line 60R connected to a cooling load 62. Supply line 60S and return line 60R can be in fluid communication with air handler 22 via conduits 24 that circulate the process fluid through the system 10. A process fluid, for example, water, ethylene glycol, calcium chloride brine, sodium chloride brine, or any other suitable liquid, enters evaporator 38 via return line 60R and exits evaporator 38 via supply line 60S. Evaporator 38 lowers the temperature of the process fluid in the tubes. The tube bundle 60 in evaporator 38 can include a plurality of tubes and a plurality of tube bundles. The vapor refrigerant exits evaporator 38 and returns to compressor 32 by a suction line 37 to complete the circuit or cycle. In the embodiment shown in FIG. 4, compressor 32 may include pre-rotation vanes 39. The pre-rotation vanes 39 may be used at the inlet to the compressor 32 and may be fixed into a predetermined position or may have a position that is adjustable. In one embodiment, vapor compression system 14 may use one or more of each of variable speed drive (VSD) 52, motor 50, compressor 32, condenser 34, expansion device or valve 36 and/or evaporator 38 in one or more refrigerant circuits.

Figure 5:
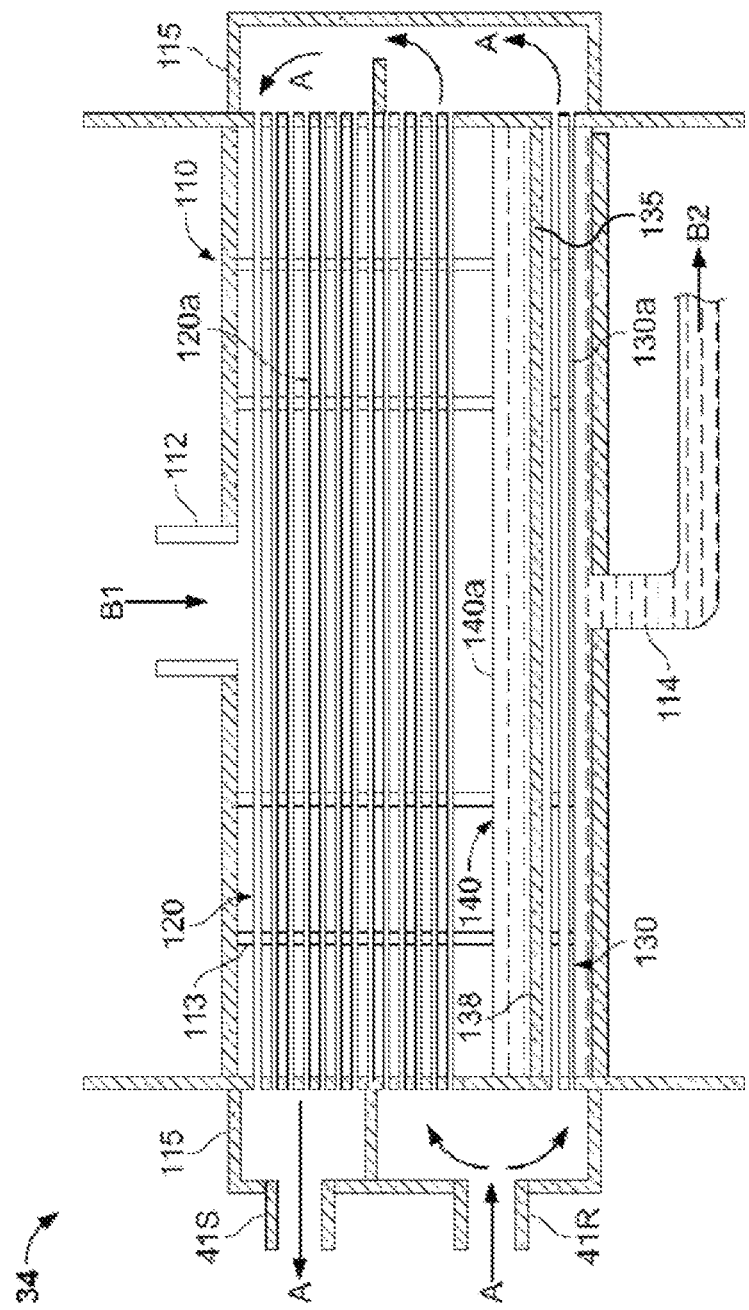
FIG. 5 shows a cross-sectional view of an embodiment of a condenser.

A cross sectional view of an embodiment of condenser 34 is shown in FIG. 5. As shown in FIG. 5, condenser 34 includes a shell 110 having a generally cylindrical geometry and includes headers or distributors 115 positioned at opposing axial ends of shell 110. Headers 115 distribute fluid to a first tube bundle 120 and a second tube bundle 130 as shown by the arrows "A". The flow path of the fluid through condenser 34 is also shown by arrows "A".

Condenser 34 further includes an inlet 112 for receiving refrigerant vapor as indicated by arrow "B1" and an outlet 114 for discharging refrigerant liquid as indicated by arrow "B2". In one embodiment, inlet 112 and outlet 114 are located at approximately the axial midpoint of condenser 34. In another embodiment, the location of inlet 112 and outlet 114 may vary in position along shell 110.

First tube bundle 120 includes tubes 120*a* circulating a process fluid that exchanges heat with refrigerant vapor entering condenser 34, causing the refrigerant vapor to condense or change state to a refrigerant liquid. In one embodiment, first tube bundle 120 can have one or more passes of process fluid through the first tube bundle 120. In the embodiment shown in FIG. 5, the first tube bundle 120 can have two passes of process fluid through the first tube bundle 120. The second tube bundle 130 can have a single pass of process fluid through the second tube bundle 130. The process fluid from the single pass through the second tube bundle 130 can be combined with the process fluid from the first pass through the first tube bundle 120 for the second pass through the first tube bundle 120.

Before, the refrigerant liquid leaves condenser 34 through outlet 114, the refrigerant liquid can be further cooled to a temperature below the saturation temperature of the refrigerant, that is, subcooled, by tubes 130*a* located in a component or housing 135 of the condenser 34 that can completely contain or enclose the second tube bundle 130. Component 135 controls the flow of the refrigerant liquid over and around tubes 130*a*. Component 135, second tube bundle 130 and tubes 130*a* can be referred to as a subcooler. Condenser 34 includes tube supports 113 for supporting tubes 120*a*. Component 135 can include corresponding structure for supporting tubes 130*a* while also enabling axial flow of refrigerant along the tubes 130*a*.

As further shown in FIG. 5, component 135 is submerged in a liquid reservoir 140 that extends along the full length of condenser 34. Liquid reservoir 140 has a liquid surface 140*a* above component 135. Liquid reservoir 140 forms a liquid seal that prevents refrigerant vapor from entering the subcooler component 135. In another embodiment, liquid surface 140*a* can be lower than a top surface 138 of component 135. In other embodiments, liquid surface 140*a* can be located relative to component 135 so as to prevent the flow of any refrigerant vapor into component 135, or in other words, liquid surface 140*a* is located above any inlet to component 135.

Figure 6:
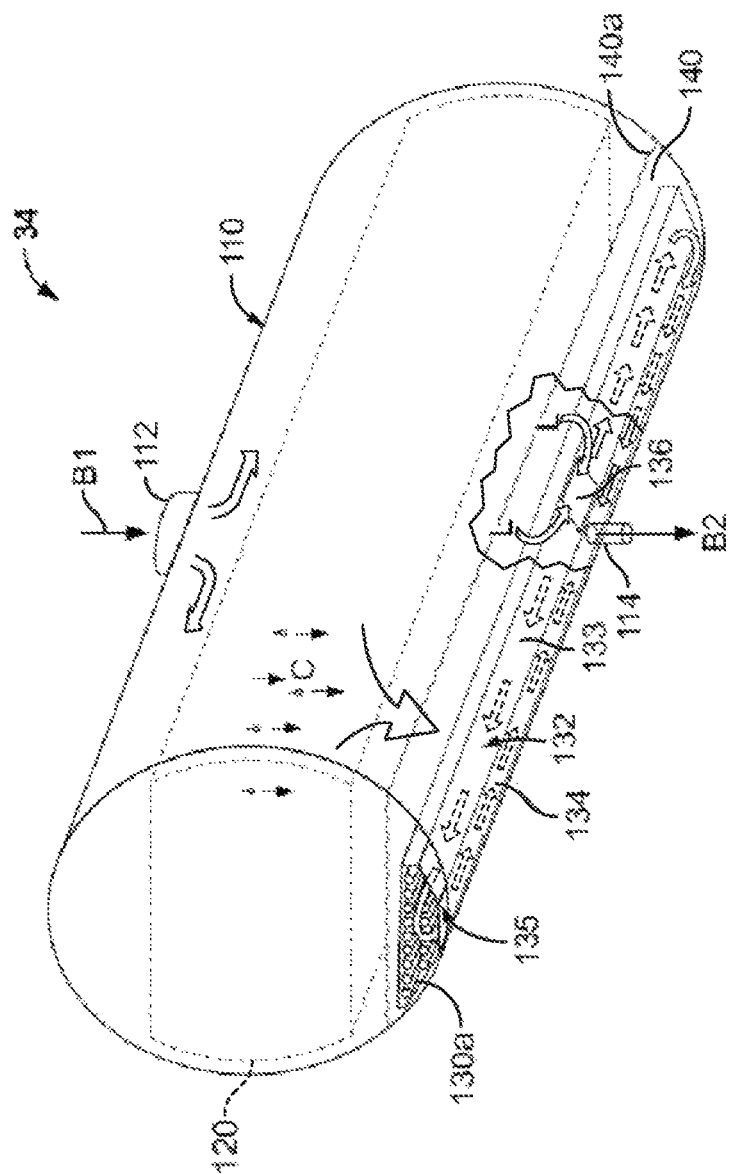
FIG. 6 shows a partial cut-away perspective view of an embodiment of a condenser.
Figure 7:
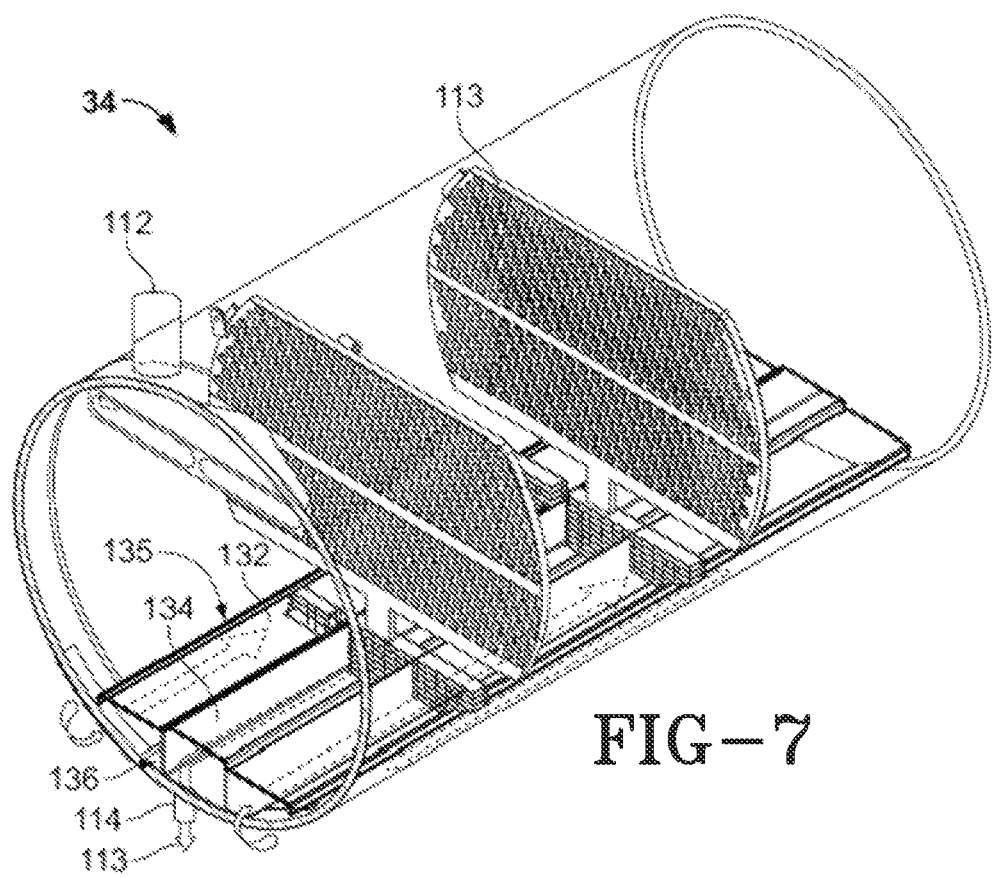
FIG. 7 shows a partial cut-away isometric cross-sectional view of an embodiment of a condenser.

FIGS. 6 and 7 show a simplified view of condenser 34 with first tube bundle 120 and headers 115 removed. In FIG. 7, tubes 130*a* are further removed. The flow of condensed refrigerant is shown by arrow "C". Condensed refrigerant collects and forms liquid reservoir 140. The refrigerant liquid then enters the component 135 through inlets 136 as indicated by arrows "L".

Second tube bundle 130 provides additional cooling to the refrigerant liquid. Refrigerant liquid enters component 135 and contacts and flows over and around tubes 130*a*. Tubes 130*a* can circulate the same or a different fluid as tubes 120*a* to exchange heat to further cool or sub-cool, that is, lower the temperature of, the refrigerant liquid.

Component 135 includes two or more outer channels 132 and a center channel 134 between the outer channels 132. Outer channels 132 include bottom walls 133 with inlets 136 in the bottom walls 133. In one embodiment, component 135 includes two or more intermediate channels between the center channel 134 and the outer channels 132. Liquid refrigerant collected in the liquid reservoir 140 enters component 135 through inlets 136 and flows over and around tubes 130*a* in outer channels 132 towards the header plates of header 115 as shown by the dashed arrows in FIG. 6, providing a first pass for the refrigerant liquid. Inlets 136 can be located approximately at the axial midpoint of the condenser 34. In another embodiment, inlets 136 can be located at any location along the bottom walls 133, e.g., at the ends of the bottom walls 133. In the embodiment shown in FIG. 6, each outer channel 132 includes a single inlet 136, however, in alternative embodiments, each outer channel 132 may be provided with more than one inlet 136. The refrigerant liquid reservoir 140 forms a liquid seal at inlets 136 to substantially prevent refrigerant vapor from entering component 135.

After refrigerant liquid flows through outer channels 132 towards headers 115, liquid refrigerant is directed into center or inner channel 134 as indicated by the arrows in FIGS. 6 and 7, where the refrigerant liquid flows over and around tubes 130*a* towards the outlet 137 (see FIG. 8) of component 135 and then outlet 114. At outlet 114, refrigerant liquid flows from condenser 34.

Figure 8:
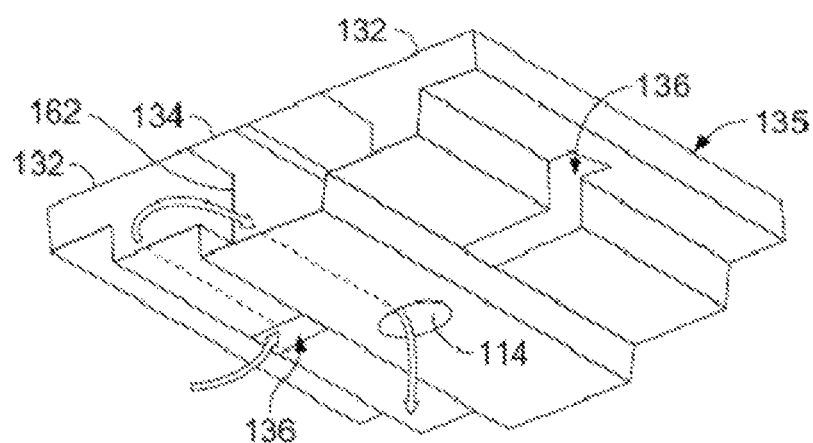
FIG. 8 shows a perspective view from below of an embodiment of a subcooler housing for a condenser.

FIG. 8 shows component 135 and the arrangement between outer channels 132 and inner channel 134. Outer channels 132 include passages or openings 162 in the walls of outer channels 132 that provide fluid communication between outer channels 132 and inner channel 134. In another embodiment, component 135 may include endcaps or headers (not shown) to provide fluid communication between outer channels 132 and inner channel 134.

Figure 9:
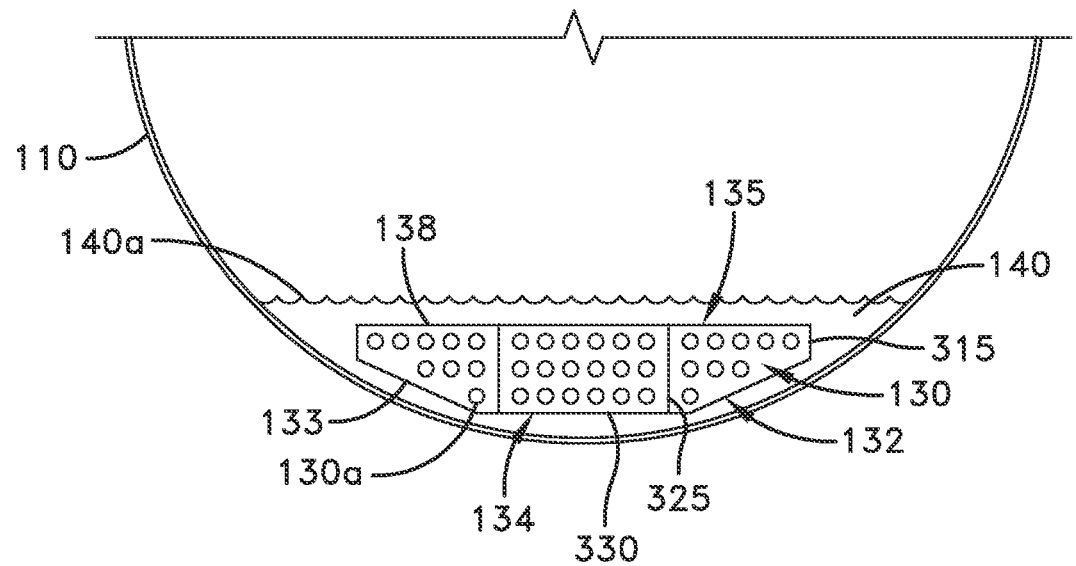
FIG. 9 shows a partial cross-sectional end view of an embodiment of a subcooler component.

FIG. 9 shows a partial end view of component 135. Outer channels 132 can be positioned on both sides of center channel 134. Second tube bundle 130 shown in FIG. 9 includes one distribution of tubes 130*a*, however, the number and distribution of tubes 130*a* may vary. Component 135 includes top surface 138 extending substantially uniformly across component 135, that is, top surface 138 can be substantially planar across component 135. Outer channels 132 include outer walls 315 and bottom walls 133. Center channel 134 includes walls 325 and bottom wall 330. Walls 325 of the center channel 134 form the inner walls of outer channels 132. The flow volume of outer channels 132 equals the flow volume of center channel 134. Component 135 substantially conforms to shell 110, thereby reducing the amount of liquid refrigerant needed in condenser 34 to cover inlets 136.

Figure 10:
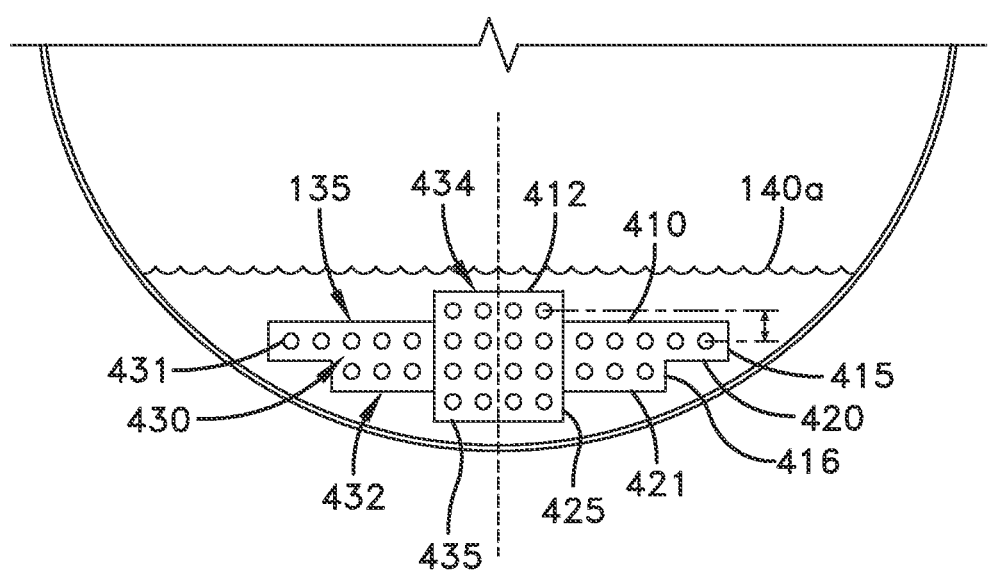
FIG. 10 shows a partial cross-sectional end view of an embodiment of a subcooler component.

FIG. 10 shows an alternative embodiment of component 135. Component 135 includes outer channels 432 positioned on either side of center channel 434. Second tube bundle 430 shown in FIG. 10 includes one distribution of tubes 431, however, the number and distribution of tubes 431 may vary. Outer channels 432 include top walls 410, first outer end walls 415, second outer end walls 416, first bottom walls 420, and second bottom walls 421. Center channel 434 includes a top wall 412, outer walls 425, and a bottom wall 435. Top wall 412 of center channel 434 is positioned at a greater elevation than top walls 410 of outer channels 432, however, in other embodiments, top wall 412 of center channel 434 may be continuous with top walls 410 of outer channels 432. The flow volume of outer channels 432 equals the flow volume of center channel 434, therefore, the cross-section of flow space for outer channels 432 must equal the cross-section of flow space for center channel 434. The stepped design of outer channels 432 allows component 135 to conform more closely to shell 110, which can result in the lowering of the liquid surface 140a, reducing the overall requirement for refrigerant liquid in the condenser 34 to cover inlets 136.

As shown in FIGS. 5, 6, 9 and 10, component 135 is submerged under liquid surface 140a of the liquid reservoir 140, however, in alternative embodiments, a portion of component 135 may be above liquid surface 140a of liquid reservoir 140. In one embodiment, component 135 is not completely submerged in liquid reservoir 140, and liquid surface 140a sufficiently covers component 135 to prevent vortexing of refrigerant liquid entering inlets 136. In another embodiment, component 135 conforms to shell 110, and the amount of refrigerant in liquid reservoir 140 can be reduced by between about 20% and about 65% over conventional condensers. In another embodiment, the amount of refrigerant in liquid reservoir 140 may be reduced by between about 30% and about 55% over conventional condensers.

FIGS. 11-14 show another embodiment of the subcooler component. A subcooler component or housing 502 can have openings or inlets 504 in a top surface 506 of the component 502 for liquid refrigerant to enter the outer channels 132 of component 502. A pan, cover or cap 508 can be placed over the openings 504 to move the opening area for the subcooler component 502 down to a lower point in the shell 110, thereby permitting an overall lower liquid refrigerant level and minimizing the amount of vapor refrigerant entering the component 502.

The cap 508 can have a predetermined axial length that is less than the axial length of the component 502. The axial length of the cap 508 can be any suitable length that covers the openings 504 and permits adequate flow of liquid refrigerant to the openings 504, i.e., provides sufficient area for the mass flow requirements of the system. In one embodiment, the axial length of the cap can be in the range of 7 inches to 27 inches and can be 14 inches, 16 inches or 18 inches.

The cap 508 can be connected to the component 502 to prevent the cap 508 from moving during operation of the condenser and uncovering some or all of the openings 504. In one embodiment, the cap 508 can be welded to the component 502. However, in other embodiments, any suitable fastening or connection technique, such as adhesives or mechanical fasteners, can be used to connect the cap 508 to the component 502.

The cap 508 can have a top or upper surface 509 that is raised or elevated a predetermined distance from the top surface 506 of the component 502. In one embodiment, the top surface 509 can be positioned between 0.75 inches and 3 inches above the top tube row of the second tube bundle 130 or the top surface 506 of the component 502. The cap 508 can have walls 511 that extend from the top surface 509 to the top surface 506 of the component 502 to form a passageway 510 between the cap 508 and the component 502. The passageway 510 can have openings 512 at the opposed ends of the cap 508 to permit liquid refrigerant to enter the passageway 510 and flow through openings 504 to the outer channels 132. The cap 508 can have sidewalls 514 that extend from the top surface 509 and at least partially cover outer walls 518 of the outer channels 132. In one embodiment, the sidewalls 514 can extend beyond the top surface 506 of the component 502 and toward the "bottom" of the shell 110 a length that corresponds to between 1 and 4 tube rows of the second tube bundle 130. The sidewalls 514 can extend a predetermined lateral distance from the outer walls 518 of the outer channels 132. In one embodiment, the sidewalls 514 can be extended from between 0.75 inches and 4 inches from the outer-most tubes(s) of the tube row(s) of the second tube bundle 130 or the outer walls 518 of the component 502. The side walls 514 can include flange portions 516 that extend to and contact the outer walls 518 of the outer channels 132 to form a vertical portion of passageway 510. The openings 512 can be located at the end of the sidewalls 514 opposite the top surface 509.

Figure 11:
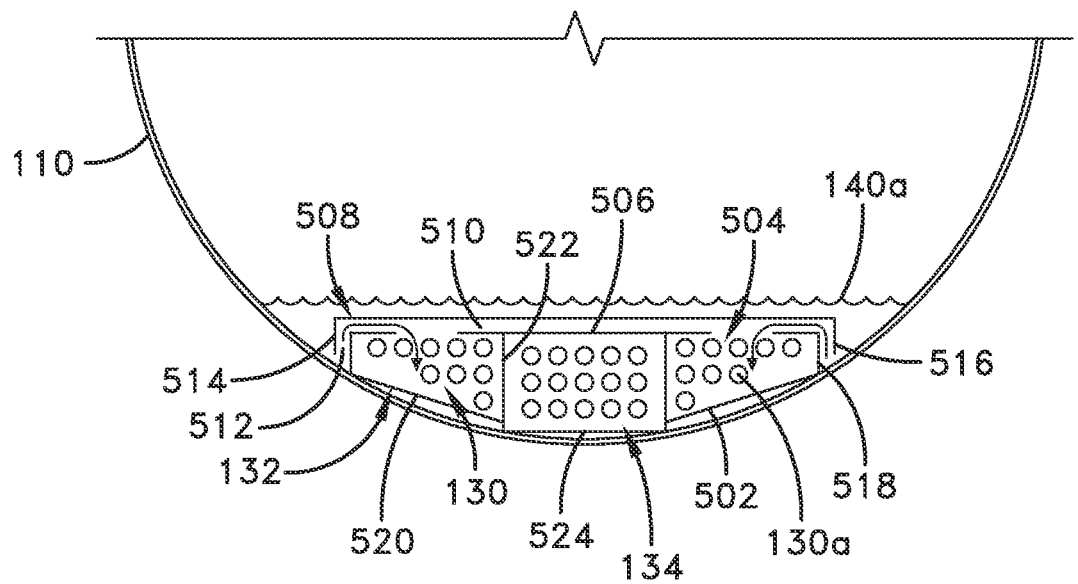
FIG. 11 shows a partial cross-sectional view of another embodiment of a subcooler component.

FIG. 11 shows a partial end view of component 502. Outer channels 132 can be positioned on both sides of center channel 134. Second tube bundle 130 shows one distribution of tubes 130a, however, the number and distribution of tubes 130a may vary. The top surface 506 of component 502 can extend substantially uniformly across component 502, that is, top surface 506 can be substantially planar across component 502. Outer channels 132 include outer walls 518 and bottom walls 520. Center channel 134 includes walls 522 and bottom wall 524. Walls 522 of the center channel 134 form the inner walls of outer channels 132. The flow volume of outer channels 132 can equal the flow volume of center channel 134. Component 502 substantially conforms to shell 110, thereby reducing the amount of liquid refrigerant needed in condenser 34 to cover inlets 136.

Figure 12:
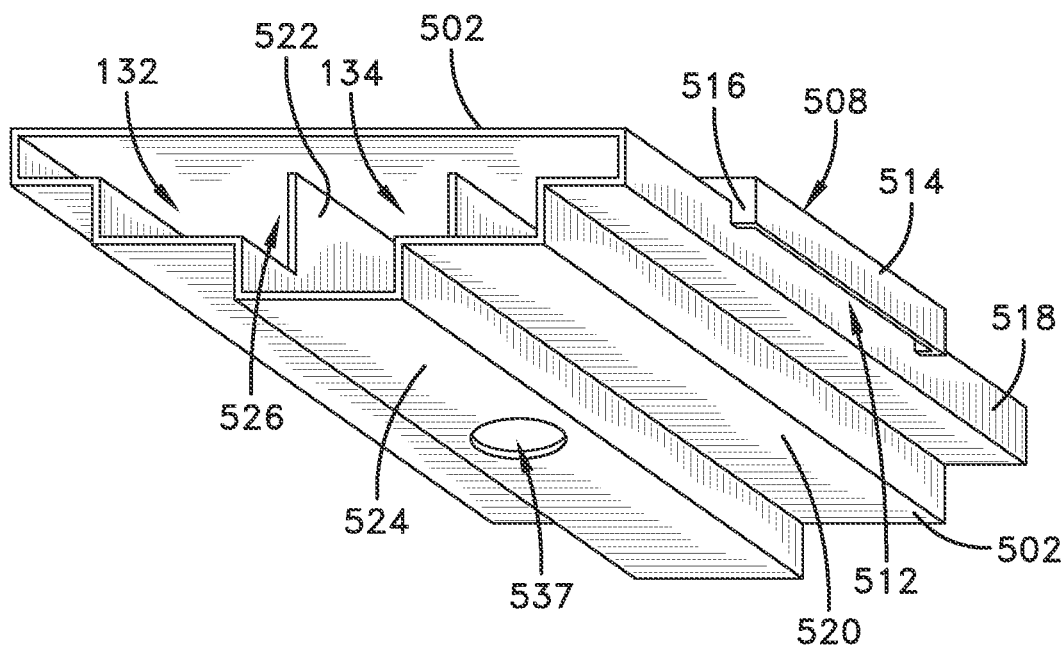
FIG. 12 shows a perspective view from below of a second embodiment of a subcooler housing for a condenser.
Figure 13:
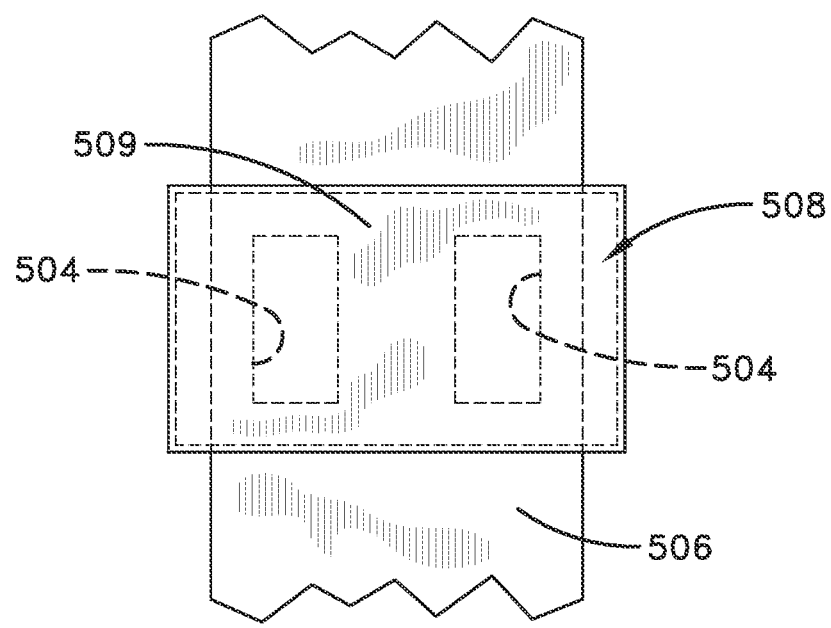
FIG. 13 shows a partial top view of an embodiment of a subcooler housing for a condenser.
Figure 14:
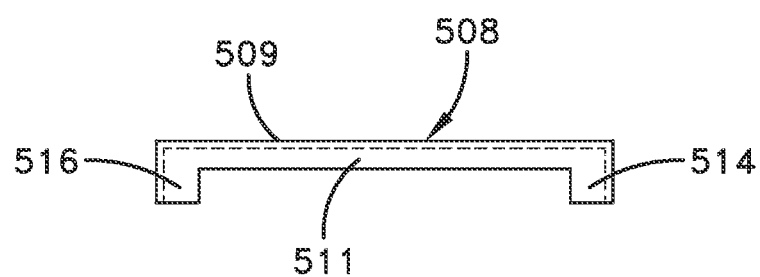
FIG. 14 shows a side view of the cap used in the embodiment of the subcooler housing of FIG. 13.

FIG. 12 shows component 502 with the end tube sheet and tubes 130a removed and the arrangement between outer channels 132 and inner channel 134. The liquid refrigerant in the bottom of the condenser, enters openings 512 of component 502 and flows through passageway 510 to openings 504 located near the axial center of condenser 34. The liquid refrigerant enters the outer channels 132 through openings 504 and flows in opposite axial directions in the outer channels 132 to the ends of the outer channels 132. Once the liquid refrigerant reaches the ends of the outer channels 132, the liquid refrigerant can enter the center channel 134 through passages or openings 526 in the walls 522 of the center channel 132. The liquid refrigerant then flows in an axial direction in the center channel to the outlet 537 and condenser outlet 114. The passages 526 can be located at the opposed ends of the walls 522. In another embodiment, component 502 may include endcaps or headers (not shown) to provide fluid communication between outer channels 132 and inner channel 134.

FIGS. 11 and 12 show different embodiments for the bottom wall 520 of the outer channels 132. In the embodiment shown in FIG. 11, the bottom wall can be a substantially planar, angled wall extending between outer wall 518 and wall 522. In the embodiment shown in FIG. 12, bottom wall can have a stepped configuration made from a plurality of planar portions connecting outer wall 518 and wall 522. In still other embodiments, the bottom walls 520 can have any suitable shape connecting outer wall 518 and wall 522 that maintains the structural integrity of outer channel 132.

In another embodiment, the component 502 can have more than one opening 504 for each outer channel 132. The openings 504 can be positioned near the middle of the component 502 or at any suitable location along the axial length of the component 502, e.g., the ends of component 502. Depending on the positioning of the openings 504, one or more caps 508 can be used to cover the openings 504 and provide a passageway 510 to the openings 504.

Figure 15:
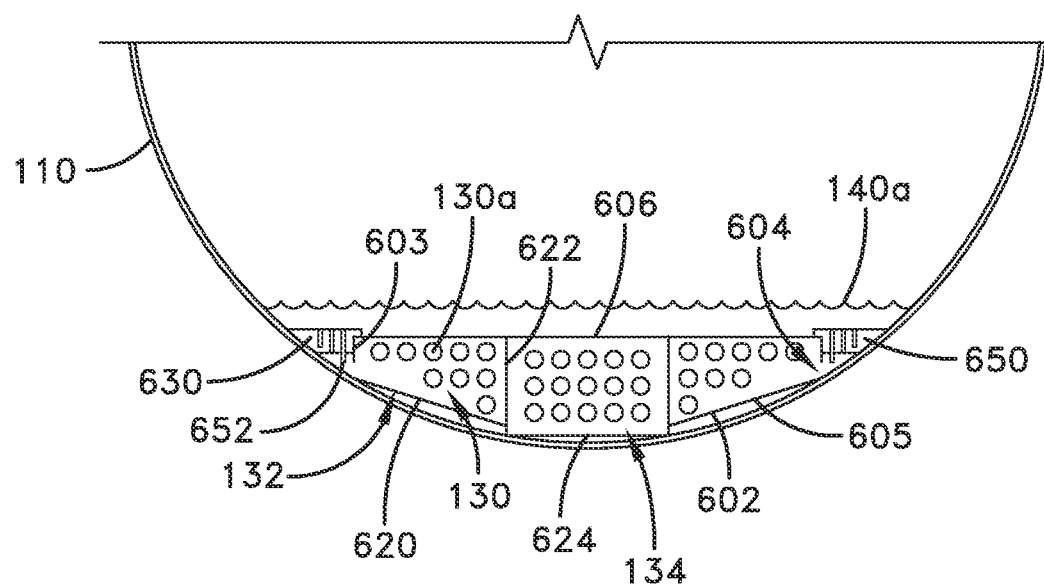
FIG. 15 shows a partial cross-sectional view of a further embodiment of a subcooler component.
Figure 16:
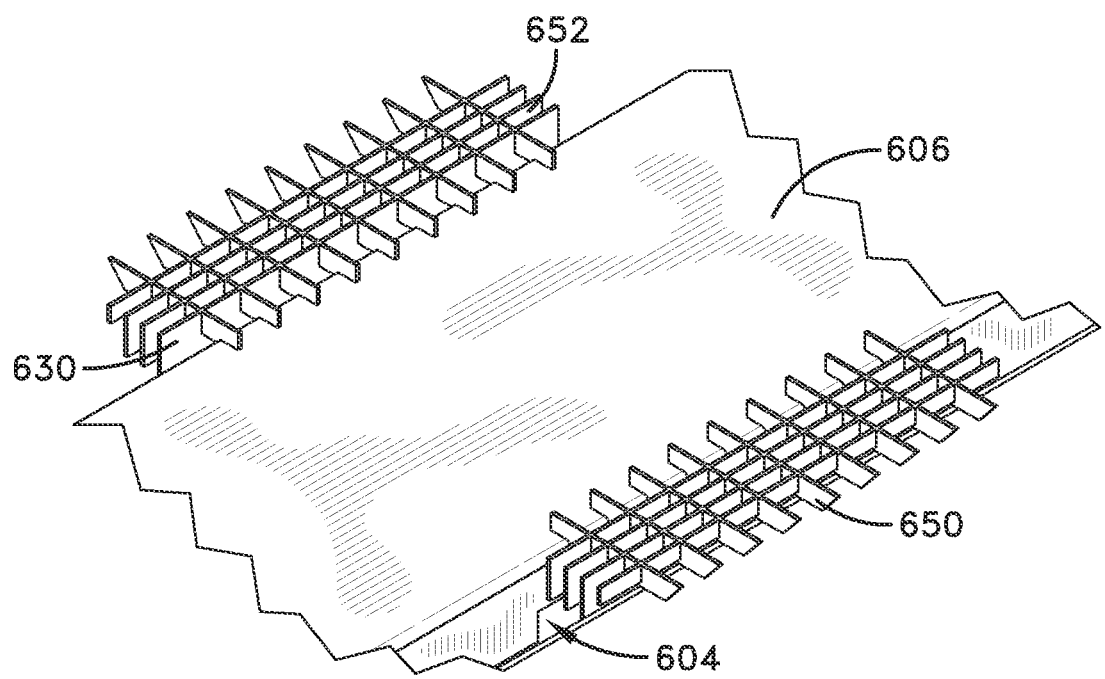
FIG. 16 shows a partial perspective view of an embodiment of a subcooler component.
Figure 17:
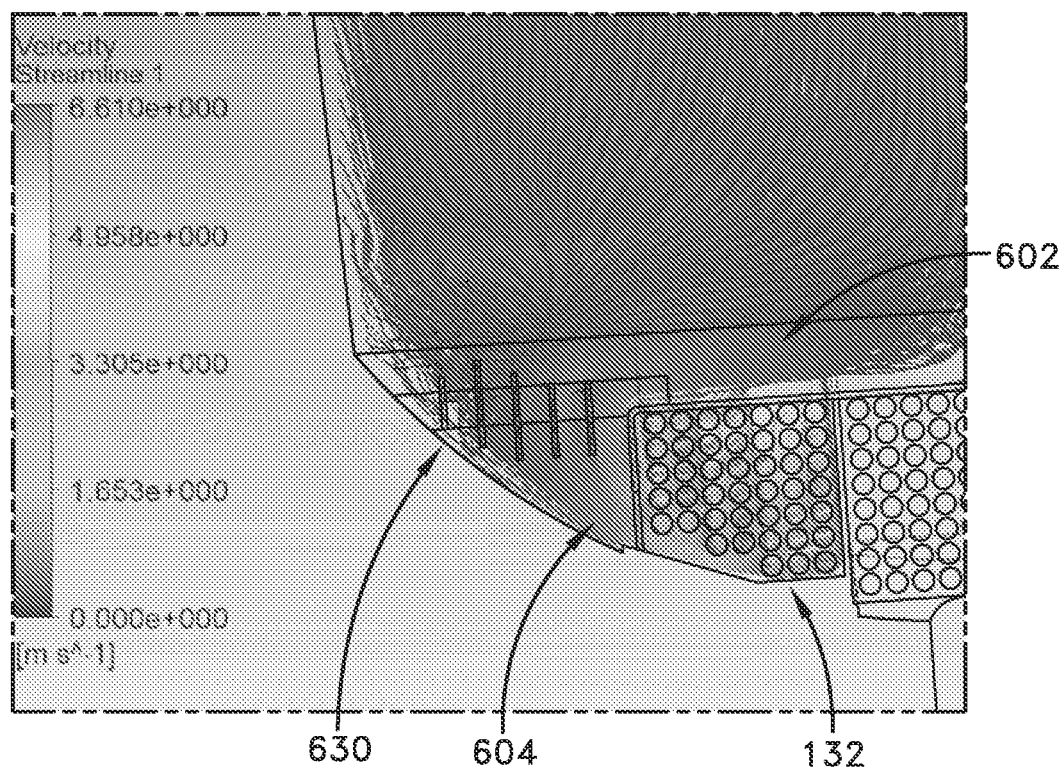
FIGS. 17 and 18 show front and bottom views of refrigerant velocity streams entering an embodiment of a subcooler component.
Figure 18:
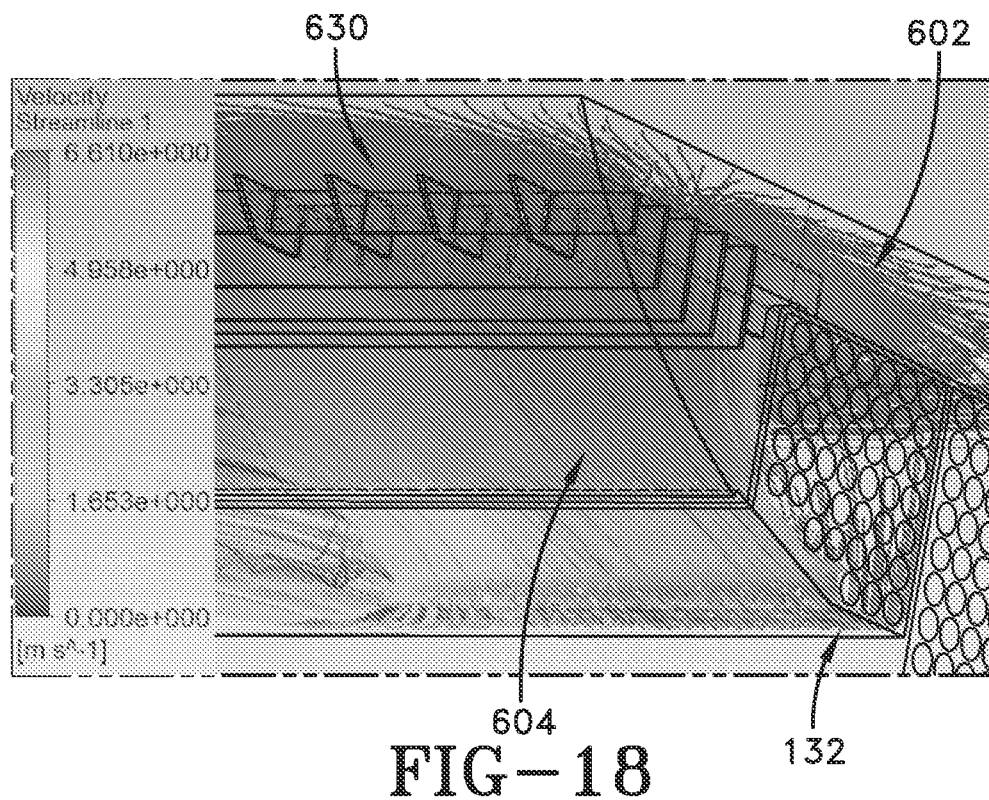

FIGS. 15 and 16 show another embodiment of the subcooler component. The embodiment of the subcooler component of FIGS. 15 and 16 is similar to the embodiment of the subcooler component from FIGS. 5-9 except that the subcooler component of FIGS. 15 and 16 includes plate grids "covering" the openings or inlets to the subcooler component. As shown in FIGS. 15 and 16, a subcooler component or housing 602 can have openings or inlets 604 on the side surfaces 603 of the component 602 for liquid refrigerant to enter the outer channels 132 of component 602. In another embodiment, the openings or inlets 604 can be located on lower surfaces 605 of the component 602. One or more plate grids 630 can be placed outside and above each of the openings 604 to reduce vortex or swirl flow of refrigerant entering the openings 604 as shown in FIGS. 17 and 18.

Each plate grid or inlet baffle 630 can have a predetermined axial length that is less than the axial length of the component 602. The axial length of the plate grid(s) 630 can be any suitable length greater than or equal to the axial length of the openings 604. In one embodiment, the axial length of the plate grid(s) 630 can be in the range of 7 inches to 27 inches and can be 14 inches, 16 inches or 18 inches.

Each plate grid 630 can be connected to the component 602 and/or the shell 110 to prevent the plate grid 630 from moving during operation of the condenser and exposing some or all of the openings 604 to direct refrigerant flow. In one embodiment, each plate grid 630 can be welded to the component 602 and/or the shell 110. However, in other embodiments, any suitable fastening or connection technique, such as adhesives or mechanical fasteners, can be used to connect the plate grid(s) 630 to the component 602 and/or the shell 110.

Each plate grid 630 can have one or more axially extending members 652 interconnected with one or more horizontally extending members 650 to form a plurality of channels for reducing the vortex motion of the refrigerant flow. Each axially extending member 652 can be positioned substantially parallel to neighboring or adjacent axially extending members 652. The axially extending members 652 can be spaced apart by a predetermined distance, e.g., 0.25 inches to 3 inches. However, in other embodiments, the spacing between axially extending members 652 can be varied based on the relative location of the axially extending member 652, e.g., the spacing of the axially extending members 652 can vary based on the proximity of the axially extending members 652 to either the shell 110 or the component 602. Similar to the axially extending members 652, each horizontally extending member 650 can be positioned substantially parallel to neighboring or adjacent horizontally extending members 650. The horizontally extending members 650 can be spaced apart by a predetermined distance, e.g., 0.25 inches to 3 inches. However, in other embodiments, the spacing between horizontally extending members 650 can be varied based on the relative location of the horizontally extending members 650, e.g., the spacing of the horizontally extending members 650 can vary based on the proximity of the horizontally extending members 650 to the center of the opening 604.

The axially extending members 652 can be positioned or oriented to be substantially perpendicular to the horizontally extending members 650. However, in another embodiment, the axially extending members 652 can be positioned or oriented at an angle, e.g., 45 degrees, to the horizontally extending members 650.

Each horizontally extending member 650 can have substantially parallel upper and lower edges that are separated by a predetermined distance. The predetermined distance between the upper and lower edges can be between 0.5 inches and 2 inches and can correspond to the height of the horizontally extending member 650. In other embodiments, the upper and lower edges of the horizontally extending members 650 do not have to be parallel and the height of the horizontally extending members 650 can vary based on the relative location of the horizontally extending member 650, e.g., the height of a horizontally extending member 650 can vary based on the proximity of the horizontally extending member 650 to the center of the opening 604. Similar to the horizontally extending members 650, each axially extending member 652 can have substantially parallel upper and lower edges that are separated by a predetermined distance. The predetermined distance between the upper and lower edges can be between 0.5 inches and 4 inches and can correspond to the height of the axially extending member 652. In other embodiments, the upper and lower edges of the axially extending members 652 do not have to be parallel and the height of the axially extending members 652 can vary based on the relative location of the axially extending member 652, e.g., the spacing of the axially extending members 652 can vary based on the proximity of the axially extending members 652 to either the shell 110 or the component 602. For example, the height of the axially extending members 652 can increase as the axially extending members 652 are located further from the shell 110 and closer to the component 602. In one embodiment, one or more axially extending members 652 can have a lower edge that corresponds to an upper edge of the opening 604. In other words, the lower edge of one or more axially extending members 652 is located at the same height (relative to the shell) as the upper edge of the opening 604.

FIG. 15 shows a partial end view of component 602. Outer channels 132 can be positioned on both sides of center channel 134. Second tube bundle 130 shows one distribution of tubes 130a, however, the number and distribution of tubes 130a may vary. The top surface 606 of component 602 can extend substantially uniformly across component 602, that is, top surface 606 can be substantially planar across component 602. Outer channels 132 include outer or side walls 603 and bottom or lower walls 605. Center channel 134 includes walls 622 and bottom wall 624. Walls 622 of the center channel 134 form the inner walls of outer channels 132. The flow volume of outer channels 132 can equal the flow volume of center channel 134. Component 602 substantially conforms to shell 110, thereby reducing the amount of liquid refrigerant needed in condenser 34 to cover inlets 604.

The liquid refrigerant can flow through plate grids 630 to openings 604 located near the axial center of condenser 34. The liquid refrigerant enters the outer channels 132 through openings 604 and flows in opposite axial directions in the outer channels 132 to the ends of the outer channels 132. Once the liquid refrigerant reaches the ends of the outer channels 132, the liquid refrigerant can enter the center channel 134 through passages or openings in the walls 622 of the center channel 132. The liquid refrigerant then flows in an axial direction in the center channel 132 to an outlet of the center channel 132 and the condenser outlet 114. The passages in the walls 622 can be located at the opposed ends of the walls 622. In another embodiment, component 602 may include endcaps or headers (not shown) to provide fluid communication between outer channels 132 and inner channel 134.

In another embodiment, the component 602 can have more than one opening 604 for each outer channel 132. The openings 604 can be positioned near the middle of the component 602 or at any suitable location along the axial length of the component 602, e.g., the ends of component 602. Depending on the positioning of the openings 504, one or more plate grids 630 can be used to cover the openings 604 and provide a plurality of channels to the openings 504.

It is important to note that the construction and arrangement of the present application as shown in the various embodiments is illustrative only. Although only a few embodiments have been described in detail in this application, those who review this application will readily appreciate that many modifications are possible (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter described in the application. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the appended claims.

Furthermore, in an effort to provide a concise description of the embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A condenser, comprising:
   a cylindrical shell having an axis;
   a first tube bundle positioned in the shell;
   a subcooler positioned in the shell beneath the first tube bundle, the subcooler comprising:
     a housing, the housing having a top surface positioned next to the first tube bundle;
     a second tube bundle enclosed within the housing;
     at least one inlet, the at least one inlet being positioned in the housing to permit liquid refrigerant to enter the housing; and
     at least one plate grid, the at least one plate grid being positioned above the at least one inlet and connected to the housing and the shell;
     wherein the at least one plate grid comprises a plurality of axial members interconnected with a plurality of horizontal members to form a plurality of channels; and
     wherein the plurality of horizontal members are connected to the top surface of the housing.

2. The condenser of claim 1, wherein the plurality of axial members are perpendicular to the plurality of horizontal members.

3. The condenser of claim 1, wherein the plurality of axial members have unequal heights.

4. The condenser of claim 3, wherein axial members of the plurality of axial members positioned next to the housing have a height greater than axial members of the plurality of axial members positioned next to the shell.

5. The condenser of claim 1, wherein the housing includes opposed side surfaces and a bottom surface opposite the top surface, the at least one inlet being positioned in at least one of the side surfaces or the bottom surface.

6. The condenser of claim 5, wherein the housing comprises a center channel and at least two outer channels positioned on opposing sides of the center channel.

7. The condenser of claim 6, wherein the at least one inlet comprises at least two inlets, each inlet of the at least two inlets is in fluid communication with a corresponding outer channel of the at least two outer channels to permit liquid refrigerant to enter a corresponding outer channel.

8. The condenser of claim 7, wherein the at least one plate grid comprises at least two plate grids, each plate grid of the at least two plate grids is positioned above a corresponding inlets of the at least two inlets to direct liquid refrigerant to the corresponding inlet.

* * * * *